(12) United States Patent
MacLennan et al.

(10) Patent No.: US 8,260,738 B2
(45) Date of Patent: Sep. 4, 2012

(54) FORECASTING BY BLENDING ALGORITHMS TO OPTIMIZE NEAR TERM AND LONG TERM PREDICTIONS

(75) Inventors: C. James MacLennan, Redmond, WA (US); Shuvro Mitra, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 1044 days.

(21) Appl. No.: 12/147,501

(22) Filed: Jun. 27, 2008

(65) Prior Publication Data

US 2009/0327206 A1 Dec. 31, 2009

(51) Int. Cl.
*G06F 17/00* (2006.01)
*G06N 7/00* (2006.01)
*G06N 7/08* (2006.01)

(52) U.S. Cl. ........................................ 706/59
(58) Field of Classification Search ............... 706/59
See application file for complete search history.

(56) References Cited

U.S. PATENT DOCUMENTS

| | | | |
|---|---|---|---|
| 6,125,105 A | 9/2000 | Edwards et al. | |
| 6,567,006 B1 * | 5/2003 | Lander et al. | 340/605 |
| 6,611,726 B1 | 8/2003 | Crosswhite | |
| 7,072,863 B1 | 7/2006 | Phillips et al. | |
| 7,747,641 B2 * | 6/2010 | Kim et al. | 707/769 |
| 2003/0210680 A1 * | 11/2003 | Rao et al. | 370/352 |
| 2004/0260664 A1 * | 12/2004 | Thiesson et al. | 706/21 |
| 2006/0010101 A1 | 1/2006 | Suzuki et al. | |
| 2006/0129395 A1 | 6/2006 | Thiesson et al. | |
| 2006/0217939 A1 * | 9/2006 | Nakata et al. | 702/189 |
| 2007/0016427 A1 * | 1/2007 | Thumpudi et al. | 704/500 |
| 2007/0135957 A1 * | 6/2007 | Ogawa et al. | 700/109 |
| 2007/0150077 A1 | 6/2007 | Bocharov et al. | |
| 2007/0208492 A1 | 9/2007 | Downs et al. | |
| 2008/0103847 A1 * | 5/2008 | Sayal et al. | 705/7 |

OTHER PUBLICATIONS

"Microsoft Time Series Algorithm Technical Reference (Analysis Services—Data Mining)", Microsoft Technet, 2008, Microsoft Corporation, pp. 6.
Meek, et al., "Autoregressive Tree Models for Time-Series Analysis", SIAM International Conference on Data Mining, 2002, pp. 16.
Lawton, "New Approach to Method Selection Based on Combining Methods", retrieved at <<http://www.cems.uwe.ac.uk/~rblawton/rl-isf2005talk.pdf>>, University of the West of England, pp. 5, no date.
Lukawiecki, "Using Data Mining in Your IT Systems", 2007, Project Botticelli Ltd & Microsoft Corporation, pp. 69.

\* cited by examiner

*Primary Examiner* — Kakali Chaki
*Assistant Examiner* — Peter Coughlan
(74) *Attorney, Agent, or Firm* — Gonzalez Saggio & Harlan LLP (57) ABSTRACT

Described is time-weighted blending of the results of time series algorithms in a manner that changes their relative weights based on the prediction time. The prediction values from each algorithm are mathematically blended into a forecast result corresponding to the desired time of prediction. In this manner, an ARTXP algorithm that provides accurate near term predictions is given more weight than an ARIMA for near term predictions, and less relative weight for long term predictions. An example exponential function to compute the relative weights is described; the function corresponds to a curve having a control variable for the slope and the start of the curve, and constant coefficients, with the weights based (in part) on the prediction time. A user-provided parameter may also affect the relative weights used in the blending result.

16 Claims, 6 Drawing Sheets

FORECASTING BY BLENDING ALGORITHMS TO OPTIMIZE NEAR TERM AND LONG TERM PREDICTIONS

BACKGROUND

In general, a time series algorithm attempts to predict a future result based on past data. Microsoft Corporation provided a time series algorithm in SQL Server based on an algorithm referred to as ARTXP (Auto regressive tree with cross prediction) for forecasting.

The ARTXP algorithm is highly optimized for near term predictions, and thus very good at forecasting them. However the algorithm's accuracy degraded for long term predictions. It was occasionally unstable for long term predictions which made it sometimes unusable beyond the first few time stamps for which a forecast was requested.

In a later version, namely SQL Server 2008, forecasting was implemented via the well-known ARIMA (Auto regressive integrated moving average) algorithm for time series forecasting. ARIMA is known to have stable long term forecasting characteristics.

SUMMARY

This Summary is provided to introduce a selection of representative concepts in a simplified form that are further described below in the Detailed Description. This Summary is not intended to identify key features or essential features of the claimed subject matter, nor is it intended to be used in any way that would limit the scope of the claimed subject matter.

Briefly, various aspects of the subject matter described herein are directed towards a technology by which a time series forecast is determined by blending the results of two (or more) time series algorithms in a manner that changes their relative weights based on the prediction time. Upon receiving input corresponding to a desired time of prediction (e.g., a time step), the time series algorithms each produces a prediction value. The prediction values are mathematically blended into a forecast result corresponding to that desired time of prediction.

For example, a first (e.g., ARTXP) algorithm provides accurate near term predictions, whereby blending the prediction values into the forecast result gives more weight to the first algorithm relative to the second (e.g., ARIMA) algorithm when the desired time of prediction is near term. Conversely, when the desired time of prediction is long term, blending the prediction values gives more weight to the second algorithm relative to the second algorithm.

In one aspect, the blending of the prediction values uses an exponential function to compute the relative weights. The function corresponds to a curve having a control variable for the slope and the start of the curve, and constant coefficients, with the weights based (in part) on the prediction time. A user provided parameter may also affect the weights used in the blending result.

Other advantages may become apparent from the following detailed description when taken in conjunction with the drawings.

BRIEF DESCRIPTION OF THE DRAWINGS

The present invention is illustrated by way of example and not limited in the accompanying figures in which like reference numerals indicate similar elements and in which.

DETAILED DESCRIPTION

Various aspects of the technology described herein are generally directed towards blending the results of two (or more) time series algorithms in a manner that provides more optimal near term and long term predictions. In one aspect, an exponential degrading technique is used to blend the ARTXP and ARIMA algorithms for more optimal forecasting.

More particularly, instead of relying on ARTXP, the technology described herein employs a second algorithm, ARIMA which provides more stable long term predictions, and implements a degrading blending method for the outputs of the two algorithms, to favor ARTXP for near term and ARIMA for long term predictions. Any resulting forecasts are more optimal and stable, in that those for near term predictions are more weighted in favor of ARTXP, while those for long term since are weighted in favor of ARIMA.

While the examples described herein are directed towards blending two algorithms, namely ARTXP for near term forecasting, and ARIMA for long term forecasting, based on the desired forecast step/time, it is understood that these are only examples. For example, other time series algorithms may be used, and more than two may be blended (e.g., one favoring short term, one for medium term and one for long term predictions). Further, while an exponential weighing function is used for blending, other functions may be used, including with different shapes, starting points and so forth. Still further, while the weight of the short term decreases with time and the long term increases with time, it is understood that time is only one way to change weighting, and other factors such as variance, sample number and so forth that are not necessarily time data may be used to degrade one algorithm's result going forward.

As such, the present invention is not limited to any particular embodiments, aspects, concepts, structures, functionalities or examples described herein. Rather, any of the embodiments, aspects, concepts, structures, functionalities or examples described herein are non-limiting, and the present invention may be used various ways that provide benefits and advantages in computing and forecasting in general.

Figure 1:
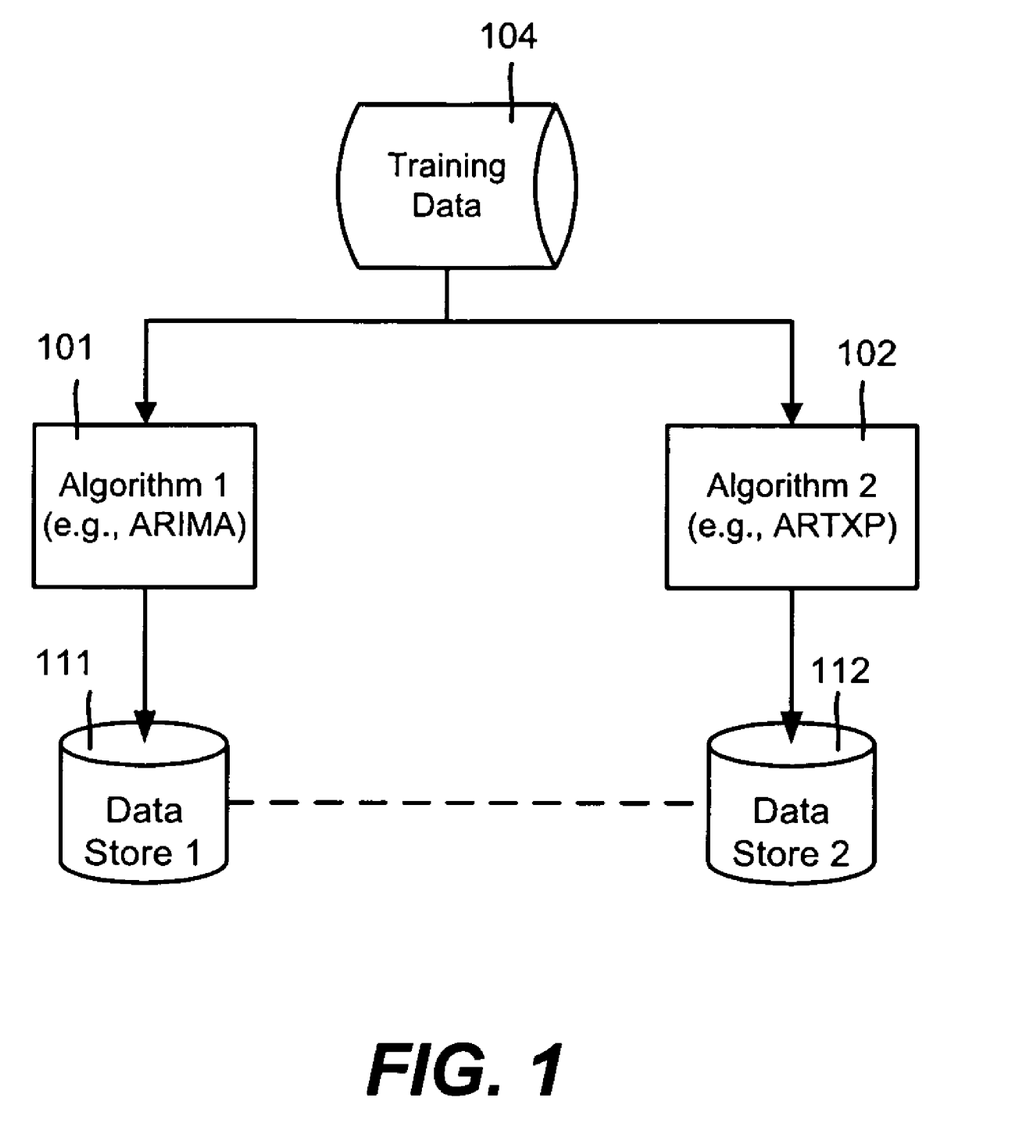
FIG. 1 is block diagram showing an example training environment for training time series algorithms.

As generally represented in FIG. 1, there is shown a training mechanism for training two algorithms Algorithm 1 (101) and Algorithm 2 (102), with one set of training data 104. Typically the training data is time-based historical data used by a business or the like in forecasting, e.g., weekly sales data.

ARTXP uses a decision tree to split the input training set data 104 into nodes and then computes an auto regressive formula on each leaf node for the prediction. It has been observed that ARTXP is very accurate for predicting when given initial (near term) time steps, but the accuracy degraded and was occasionally unstable for long term predictions.

Training for ARIMA is well known and is not described herein, except to note that the same training data 104 is used to generate both sets of patterns. Each algorithm may then use its respective pattern, maintained in a respective data store 111 or 112; note that the dashed line indicates that the pattern datasets may be maintained in one physical and/or logical store.

To summarize the training phase, the training data 104 is passed to the algorithms 101 and 102, which process the data in parallel. After the training is completed, the training patterns obtained from the algorithms are stored for later usage.

Figure 2:
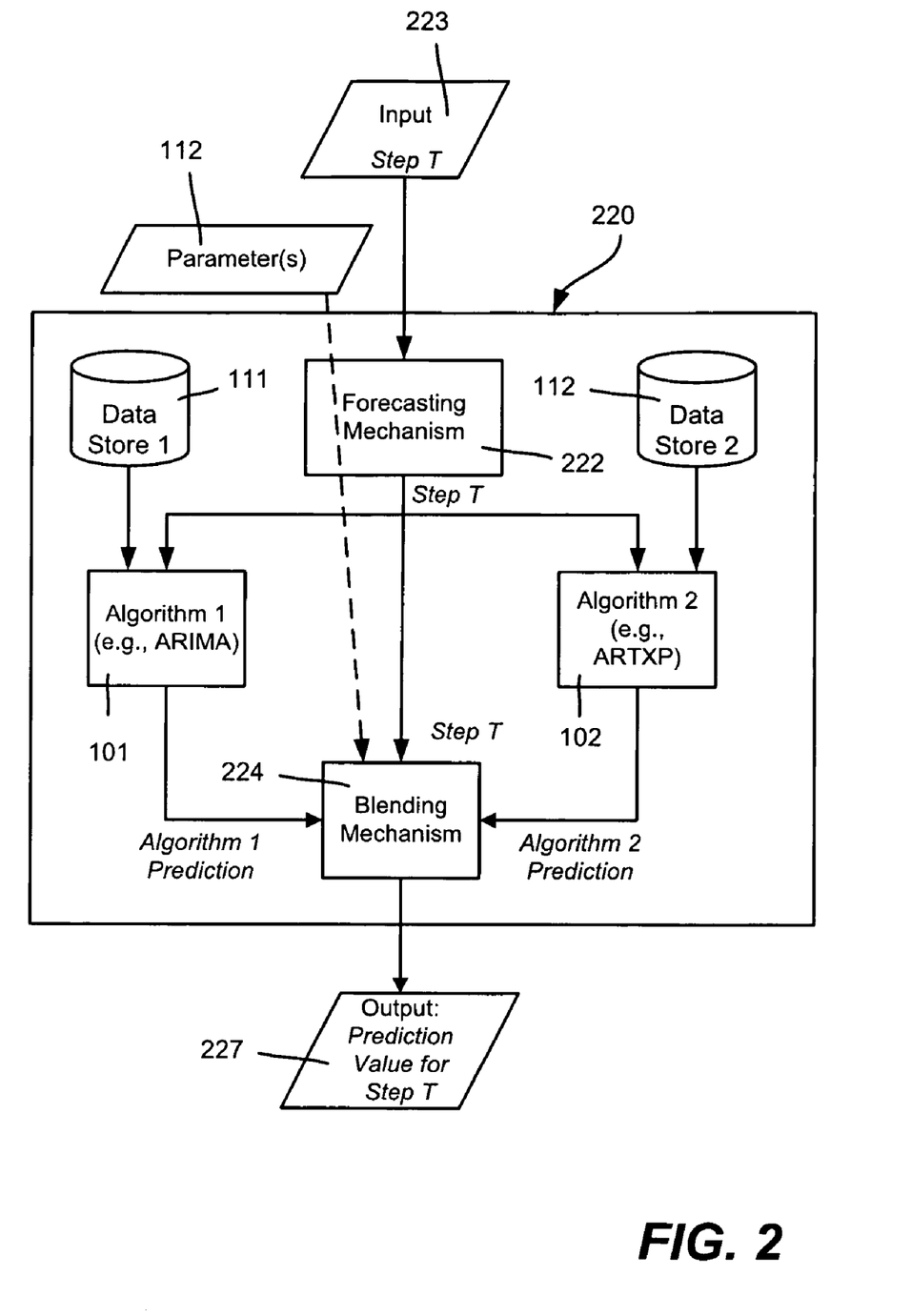
FIG. 2 is block diagram showing an example environment for time-based blending of two time series algorithm results into a forecast result.

FIG. 2 shows how the two algorithms operate together in one example implementation, e.g., that provides an overall time series algorithm 220. More particularly, during a forecasting phase, predictions are obtained from each of the algorithms 101 and 102. To this end, a forecasting mechanism 222 feeds the time value or the like (step T) for which the prediction is desired as input 223 into each algorithm 101 and 102. A blending mechanism 224 combines the algorithms' outputs using a blending technique; one such time-based example blending technique is described below. The blended output 227 is returned as the prediction value, e.g., as a <step T, result> pairing. Note that one or more variable parameters 229 may be used by the blending mechanism 224, as described below.

In one example implementation in which ARTXP and ARIMA are the algorithms, to obtain the advantages of ARTXP for near term predictions and improve the stability for the long term predictions using ARIMA, the blending method combined the output of the algorithms in a manner that weighs each algorithm's contribution based on the time of the prediction, that is, near term predictions favor ARTXP and long term predictions favor ARIMA. One mechanism for such degrading blending is an exponential curve with a control variable for the slope and the start of the curve, and constant coefficients (chosen experimentally) for more optimal performance.

Another consideration in developing the blending mechanism 224 is to allow the user some control over the blending, e.g., via a user variable (parameter 229). For example, one variable is in the range from zero to one [0, 1] for controlling the starting point for blending and the rate of degradation of the weights. When the variable is set to zero, the output is ARTXP only; when it is one, the output is ARIMA only. Anything in between is a mixed output, yet still favoring ARTXP in the short term and ARIMA for long term.

One example function for blending is set forth below:

$$W(T) = (1-p)^* e^{-pC(T-1)}$$

where

W: is the weight Function

T: is the prediction time step (1, 2, 3, 4 . . . )

p: is the user variable in the range [0,1], default value being 0.5 c: is an empirical constant whose value has been experimentally determined for optimal forecasting.

The blending for ARTXP and ARIMA for any time step T is a weighted average of the output where the weights are assigned as:

$$ARTXP(T) = W(T)$$

$$ARIMA(T) = 1 - W(T)$$

Figure 3:
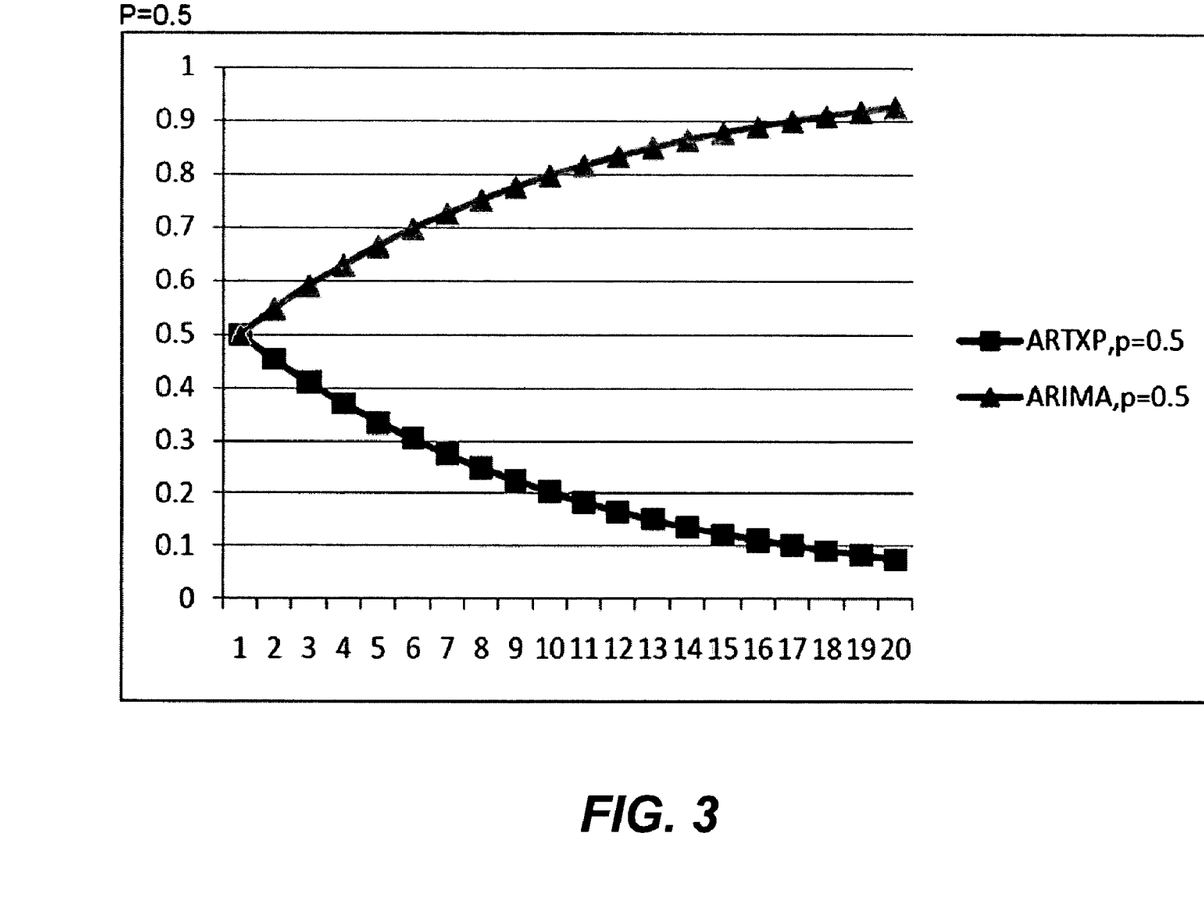
FIGS. 3 and 4 are representations of characteristics of the weight function with different user-provided parameter values.
Figure 4:
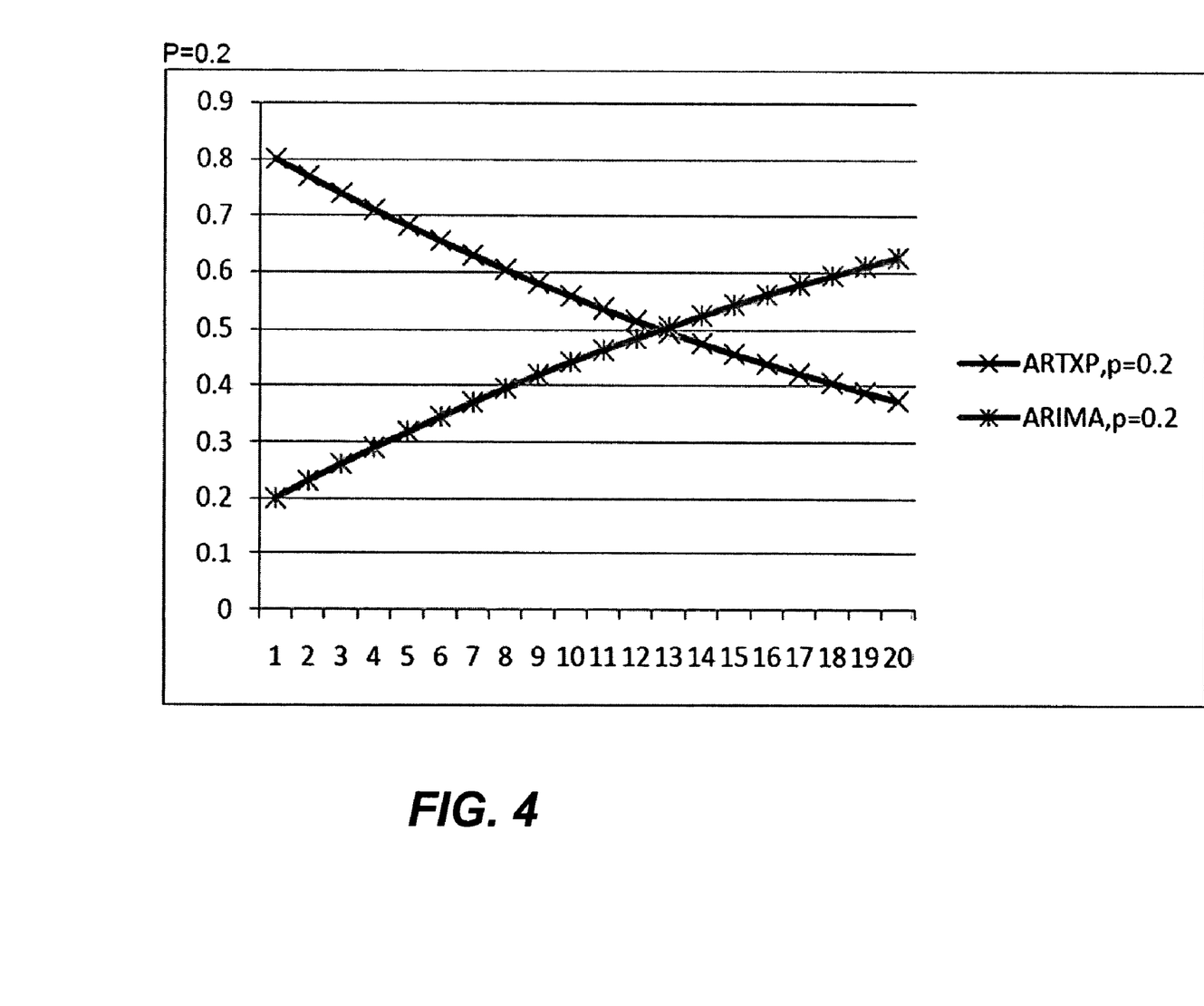

By way of example, FIGS. 3 and 4 show the characteristics of the weight function for two different values of p, namely 0.5 (FIG. 3) and 0.2 FIG. 4. Note that 0.5 is also the default value.

Figure 5:
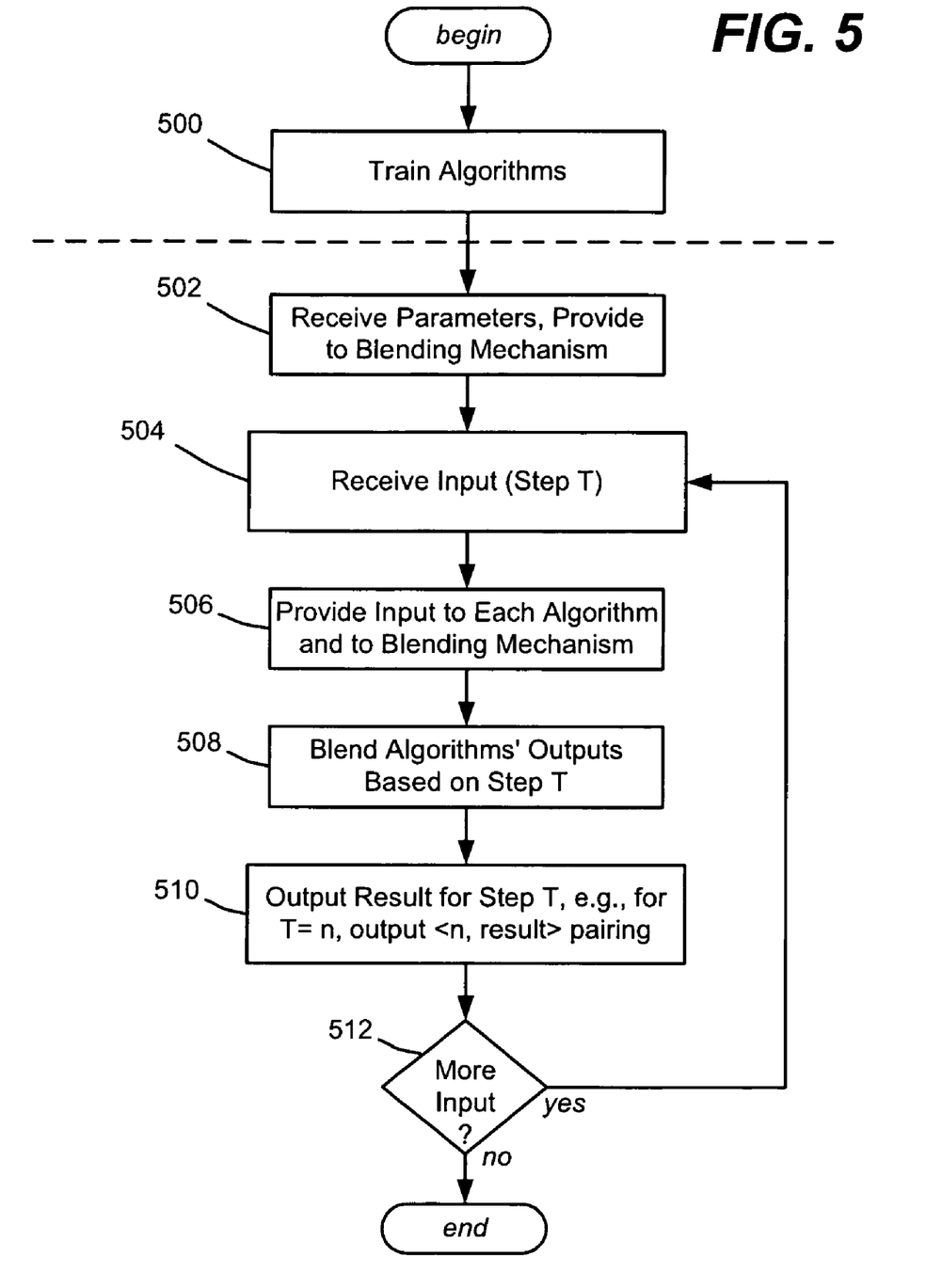
FIG. 5 is a flow diagram representing example steps taken to blending two time series algorithm results into a forecast result based on a desired prediction time.

By way of summary, FIG. 5 shows example steps that may be taken in performing the blended forecasting, beginning at step 500 which represents training the algorithms. Training may be updated as new actual data becomes known; the dashed line in FIG. 5 delineates the training stage from the usage stage.

Step 502 represents receiving the parameter 229 (or parameters) that a user may provide, e.g., the "p" user variable in the above equation. Step 504 represents receiving the time step T for which a prediction is being requested.

Step 506 represents passing the time step as input to each algorithm, which each output a forecast, and also providing the time step value to the blending mechanism for use in its blending calculation. Step 510 outputs the blended result.

In some forecasting scenarios, multiple forecasts for different times are desired, e.g., the predicted sales for each of the next four months. Step 512 represents processing additional input, e.g., so that the user need not individually feed each month's time step in as input.

It should be noted that a time series algorithm computes future predictions based on existing data, along with any predicted data that is needed to get to the desired time. For example, if monthly historical data is available through July, and the request is for an October forecast, the time series algorithm computes predicted August and September data in order to compute the October data. As can be readily appreciated, with two algorithms the example August and September data may be computed independently to obtain separate October data, which is then blended into a final result. As an alternative, however, the August data may be computed and blended, then that blended result used to compute the two September data results, which in turn may be blended into a combined September result that is then used to obtain the two October results, which are then blended into the final result.

Other blending algorithms are feasible. For example, instead of an exponential function, a linear function may be used. Instead of a gradual function, the function may be more discrete, e.g., solely use one algorithm (or some large percentage thereof) up to time X, and use the other algorithm after time X. If percentages are used, e.g., eighty/twenty before time X, they need not be same ratio after time X, e.g., ten/ninety may be used after time X, for example. Further, there may be more than one weight/percentage switching time, e.g., times $X_1$, $X_2$, $X_3$ and so forth may each switch the algorithms' relative contributions, such as performed via a table lookup or the like. In this manner, for example, observed variances as to when ARTXP becomes more and more unstable, each resulting in less and less of ARTXP's execution, may be used to implement a blending mechanism.

Exemplary Operating Environment

Figure 6:
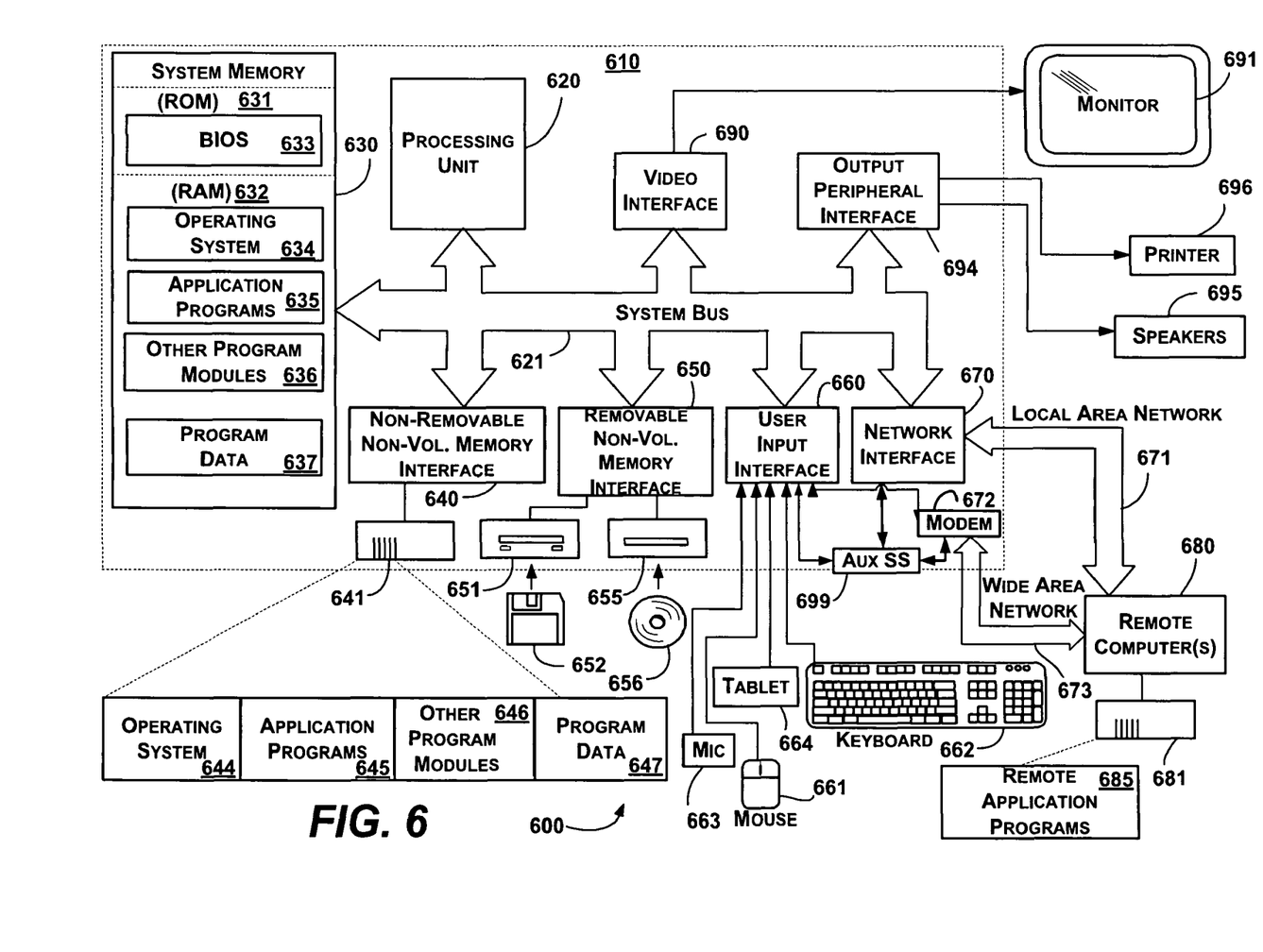
FIG. 6 shows an illustrative example of a computing environment into which various aspects of the present invention may be incorporated.

FIG. 6 illustrates an example of a suitable computing and networking environment 600 on which the examples and/or implementations of FIGS. 1-5 may be implemented. The computing system environment 600 is only one example of a suitable computing environment and is not intended to suggest any limitation as to the scope of use or functionality of the invention. Neither should the computing environment 600 be interpreted as having any dependency or requirement relating to any one or combination of components illustrated in the exemplary operating environment 600.

The invention is operational with numerous other general purpose or special purpose computing system environments or configurations. Examples of well known computing systems, environments, and/or configurations that may be suitable for use with the invention include, but are not limited to: personal computers, server computers, hand-held or laptop devices, tablet devices, multiprocessor systems, microprocessor-based systems, set top boxes, embedded systems, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, and so forth, which perform particular tasks or implement particular abstract data types. The invention may also be practiced in distributed computing environments where tasks are performed by remote processing devices that are linked through a communications network. In a distributed computing environment, program modules may be located in local and/or remote computer storage media including memory storage devices.

With reference to FIG. 6, an exemplary system for implementing various aspects of the invention may include a general purpose computing device in the form of a computer 610. Components of the computer 610 may include, but are not limited to, a processing unit 620, a system memory 630, and a system bus 621 that couples various system components including the system memory to the processing unit 620. The system bus 621 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computer 610 typically includes a variety of computer-readable media. Computer-readable media can be any available media that can be accessed by the computer 610 and includes both volatile and nonvolatile media, and removable and non-removable media. By way of example, and not limitation, computer-readable media may comprise computer storage media and communication media. Computer storage media includes volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by the computer 610. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above may also be included within the scope of computer-readable media.

The system memory 630 includes computer storage media in the form of volatile and/or nonvolatile memory such as read only memory (ROM) 631 and random access memory (RAM) 632. A basic input/output system 633 (BIOS), containing the basic routines that help to transfer information between elements within computer 610, such as during start-up, is typically stored in ROM 631. RAM 632 typically contains data and/or program modules that are immediately accessible to and/or presently being operated on by processing unit 620. By way of example, and not limitation, FIG. 6 illustrates operating system 634, application programs 635, other program modules 636 and program data 637.

The computer 610 may also include other removable/non-removable, volatile/nonvolatile computer storage media. By way of example only, FIG. 6 illustrates a hard disk drive 641 that reads from or writes to non-removable, nonvolatile magnetic media, a magnetic disk drive 651 that reads from or writes to a removable, nonvolatile magnetic disk 652, and an optical disk drive 655 that reads from or writes to a removable, nonvolatile optical disk 655 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 641 is typically connected to the system bus 621 through a non-removable memory interface such as interface 640, and magnetic disk drive 651 and optical disk drive 655 are typically connected to the system bus 621 by a removable memory interface, such as interface 650.

The drives and their associated computer storage media, described above and illustrated in FIG. 6, provide storage of computer-readable instructions, data structures, program modules and other data for the computer 610. In FIG. 6, for example, hard disk drive 641 is illustrated as storing operating system 644, application programs 645, other program modules 645 and program data 647. Note that these components can either be the same as or different from operating system 634, application programs 635, other program modules 635, and program data 637. Operating system 644, application programs 645, other program modules 645, and program data 647 are given different numbers herein to illustrate that, at a minimum, they are different copies. A user may enter commands and information into the computer 610 through input devices such as a tablet, or electronic digitizer, 654, a microphone 653, a keyboard 652 and pointing device 651, commonly referred to as mouse, trackball or touch pad. Other input devices not shown in FIG. 6 may include a joystick, game pad, satellite dish, scanner, or the like. These and other input devices are often connected to the processing unit 620 through a user input interface 650 that is coupled to the system bus, but may be connected by other interface and bus structures, such as a parallel port, game port or a universal serial bus (USB). A monitor 691 or other type of display device is also connected to the system bus 621 via an interface, such as a video interface 690. The monitor 691 may also be integrated with a touch-screen panel or the like. Note that the monitor and/or touch screen panel can be physically coupled to a housing in which the computing device 610 is incorporated, such as in a tablet-type personal computer. In addition, computers such as the computing device 610 may also include other peripheral output devices such as speakers 695 and printer 695, which may be connected through an output peripheral interface 694 or the like.

The computer 610 may operate in a networked environment using logical connections to one or more remote computers, such as a remote computer 680. The remote computer 680 may be a personal computer, a server, a router, a network PC, a peer device or other common network node, and typically includes many or all of the elements described above relative to the computer 610, although only a memory storage device 681 has been illustrated in FIG. 6. The logical connections depicted in FIG. 6 include one or more local area networks (LAN) 671 and one or more wide area networks (WAN) 673, but may also include other networks. Such networking environments are commonplace in offices, enterprise-wide computer networks, intranets and the Internet.

When used in a LAN networking environment, the computer 610 is connected to the LAN 671 through a network interface or adapter 670. When used in a WAN networking environment, the computer 610 typically includes a modem 672 or other means for establishing communications over the WAN 673, such as the Internet. The modem 672, which may be internal or external, may be connected to the system bus 621 via the user input interface 650 or other appropriate mechanism. A wireless networking component 674 such as comprising an interface and antenna may be coupled through a suitable device such as an access point or peer computer to a WAN or LAN. In a networked environment, program modules depicted relative to the computer 610, or portions thereof, may be stored in the remote memory storage device. By way of example, and not limitation, FIG. 6 illustrates remote application programs 685 as residing on memory device 681. It may be appreciated that the network connections shown are exemplary and other means of establishing a communications link between the computers may be used.

An auxiliary subsystem 699 (e.g., for auxiliary display of content) may be connected via the user interface 650 to allow data such as program content, system status and event notifications to be provided to the user, even if the main portions of the computer system are in a low power state. The auxiliary subsystem 699 may be connected to the modem 672 and/or network interface 670 to allow communication between these systems while the main processing unit 620 is in a low power state.

CONCLUSION

While the invention is susceptible to various modifications and alternative constructions, certain illustrated embodiments thereof are shown in the drawings and have been described above in detail. It should be understood, however, that there is no intention to limit the invention to the specific forms disclosed, but on the contrary, the intention is to cover all modifications, alternative constructions, and equivalents falling within the spirit and scope of the invention.

What is claimed is:

1. In a computing environment, a method comprising:
receiving input corresponding to a desired time of prediction;
providing the input to each of a plurality of time series algorithms;
receiving a prediction value from each of the time series algorithms; and
blending the prediction values into a forecast result corresponding to that desired time of prediction, based at least in part on the input corresponding to a desired time of prediction, wherein blending the prediction values into the forecast result comprises computing an exponential function based at least in part on a value corresponding to the desired time of prediction, the exponential function corresponding to a curve having a control variable set for a slope and a start of the curve, and one or more constant coefficients.

2. The method of claim 1 wherein the plurality of time series algorithms comprises a first algorithm and a second algorithm, wherein the first algorithm provides accurate near term predictions, and wherein blending the prediction values into the forecast result comprises weighing the prediction value of the first algorithm to have more weight relative to the second algorithm when the desired time of prediction is near term.

3. The method of claim 1 wherein the plurality of time series algorithms comprises a first algorithm and a second algorithm, wherein the first algorithm provides unstable long term predictions, and wherein blending the prediction values into the forecast result comprises weighing the prediction value of the second algorithm to have more weight relative to the first algorithm when the desired time of prediction is long term.

4. The method of claim 1 wherein the exponential function is: $W(T)=(1-p)*e^{-p}C(T-1)$ where W represents the weight function, T represents a prediction time step corresponding to the desired time of prediction, p represents a user variable, and c represents a constant.

5. The method of claim 4 wherein the plurality of time series algorithms comprises an autoregressive tree cross-prediction (ARTXP) algorithm and an autoregressive integrated moving average (ARIMA) algorithm, and wherein blending the prediction values comprises assigning weights factors based on the result of computing the exponential function as: weight of ARTXP(T)=W(T), and weight of ARIMA(T)=1−W(T).

6. The method of claim 1 further comprising, receiving a user parameter, and wherein blending the prediction values into a forecast result comprises applying the user parameter to affect a relative weight value computed for each algorithm.

7. The method of claim 1 further comprising, training each algorithm of the plurality.

8. In a computing environment, a system comprising:
at least one processor;
a memory, communicatively coupled to the at least one processor and containing processor executable instructions, comprising:
a first time series algorithm;
a second time series algorithm;
a blending mechanism coupled to receive output from each algorithm, the blending mechanism including an exponential function for computing the relative weights, and each algorithm and the blending mechanism configured to receive input corresponding to a prediction time, the first and second algorithms configured to provide first and second prediction results corresponding to the prediction time, and the blending mechanism configured to use the prediction time to blend the prediction values into a forecast result.

9. The system of claim 8 wherein the blending mechanism uses the prediction time to determine relative weights for the first and second algorithms that are based upon the prediction time.

10. The system of claim wherein the first algorithm comprises an autoregressive tree cross-prediction (ARTXP) algorithm.

11. The system of claim 8 wherein the first algorithm comprises an autoregressive integrated moving average (ARIMA) algorithm.

12. The system of claim 8 wherein the first algorithm provides accurate near term predictions, and wherein the blending mechanism weighs the prediction value of the first algorithm to have more weight relative to the second algorithm when the prediction time corresponds to a near term time.

13. The system of claim 8 wherein the first algorithm provides unstable long term predictions, and wherein the blending mechanism weighs the prediction value of the second algorithm to have more weight relative to the first algorithm when the prediction time corresponds to a long term time.

14. One or more computer storage devices having computer-executable instructions stored thereon, which when executed in response to execution, cause a computer to perform steps, comprising: receiving a time step; providing the time step to an autoregressive tree cross-prediction (ARTXP) time series algorithm, to an autoregressive integrated moving average (ARIMA) time series algorithm and to a blending mechanism; receiving a first prediction value from the ARTXP time series algorithm, receiving a second prediction value from the ARIMA time series algorithm; blending the first prediction value with the second prediction value based on the time step received at the blending mechanism into a forecast result, wherein the blending comprises computing an exponential function result based in part on the time step, and using the exponential function result to determine a relative weight for each prediction value; and outputting the forecast result in association with the time step.

15. The one or more computer storage devices of claim 14 wherein the exponential function corresponds to a curve having a control variable set for a slope and a start of the curve, and constant coefficients.

16. The one or more computer storage devices of claim 14 wherein computing the exponential function comprises using a user-provided parameter as a function variable.

* * * * *